Oct. 29, 1968
H. U. BAUMANN
3,407,560
EXPANDED, TRUSSED STRUCTURAL ASSEMBLANCE
AND METHOD OF ASSEMBLY
Filed Oct. 21, 1965
6 Sheets-Sheet 1
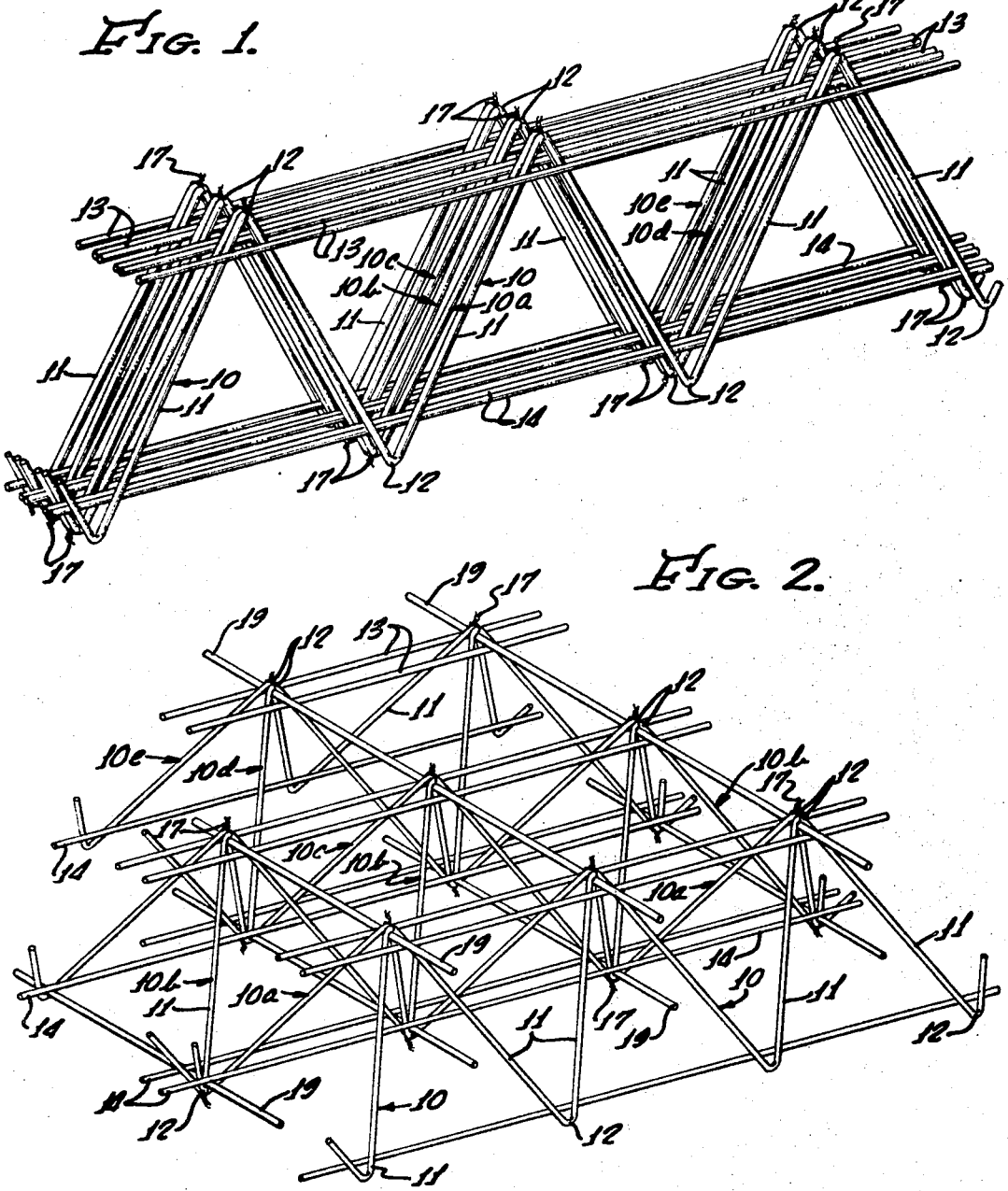
INVENTOR.
HANNS U. BAUMANN
BY
ATTORNEYS.

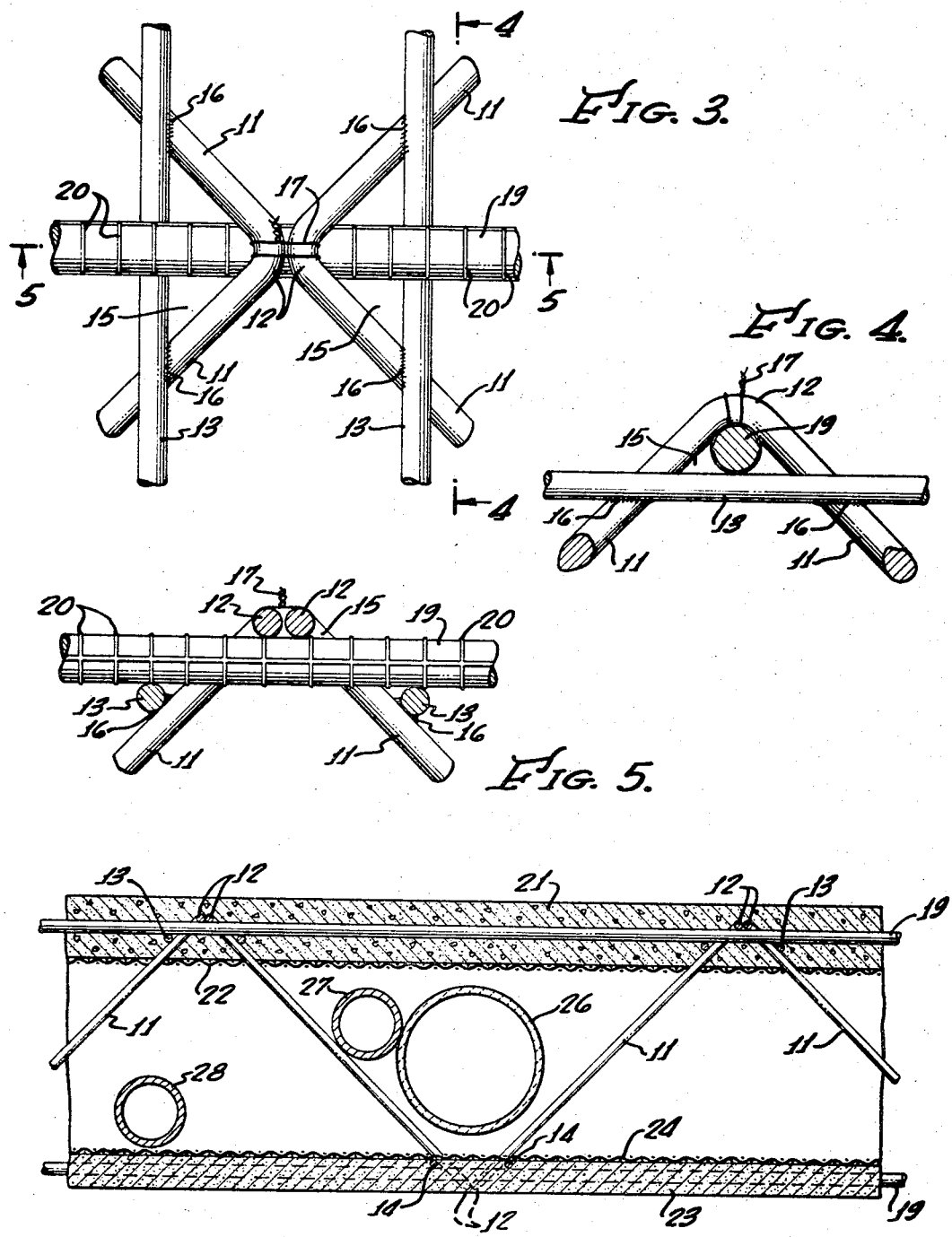

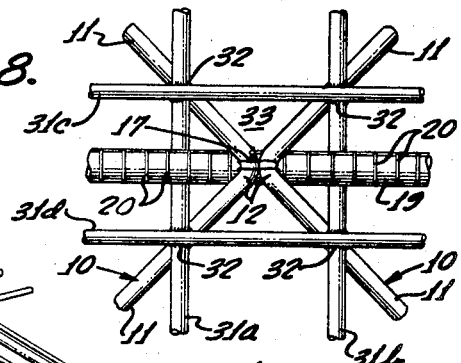

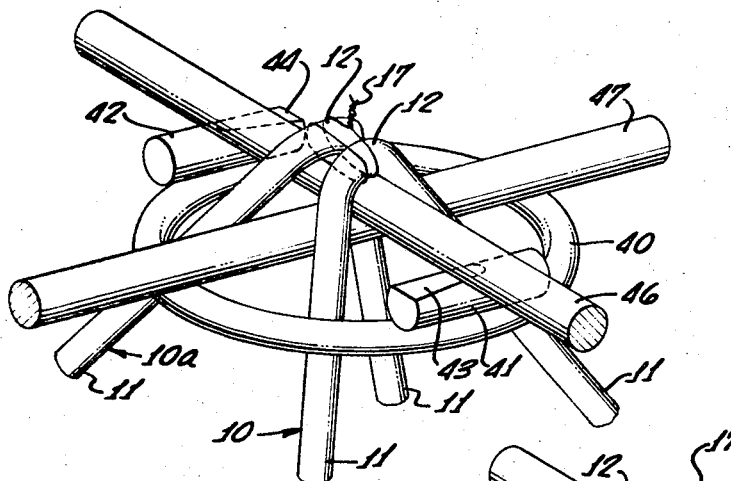
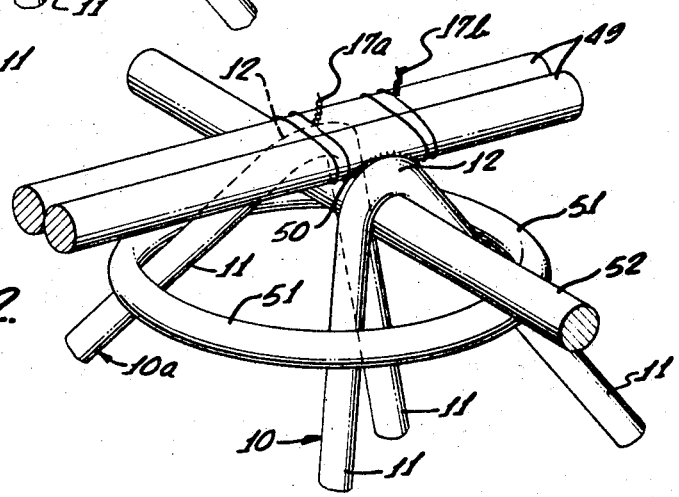
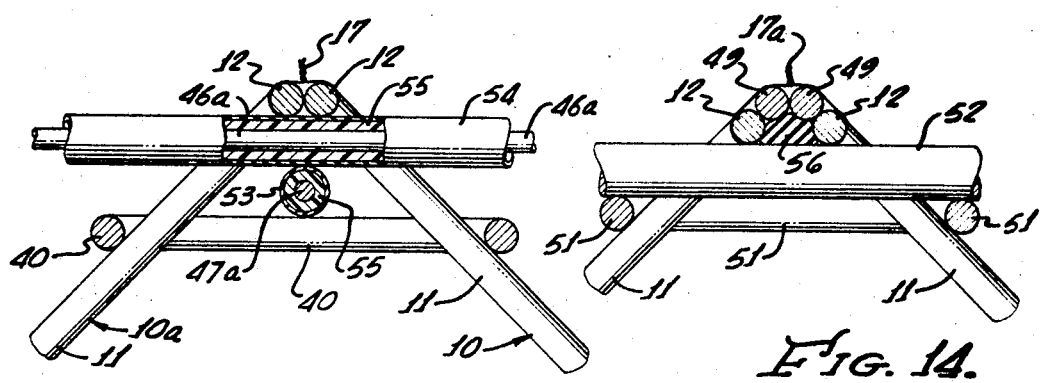

Oct. 29, 1968     H. U. BAUMANN     3,407,560
EXPANDED, TRUSSED STRUCTURAL ASSEMBLANCE
AND METHOD OF ASSEMBLY
Filed Oct. 21, 1965                                   6 Sheets-Sheet 5
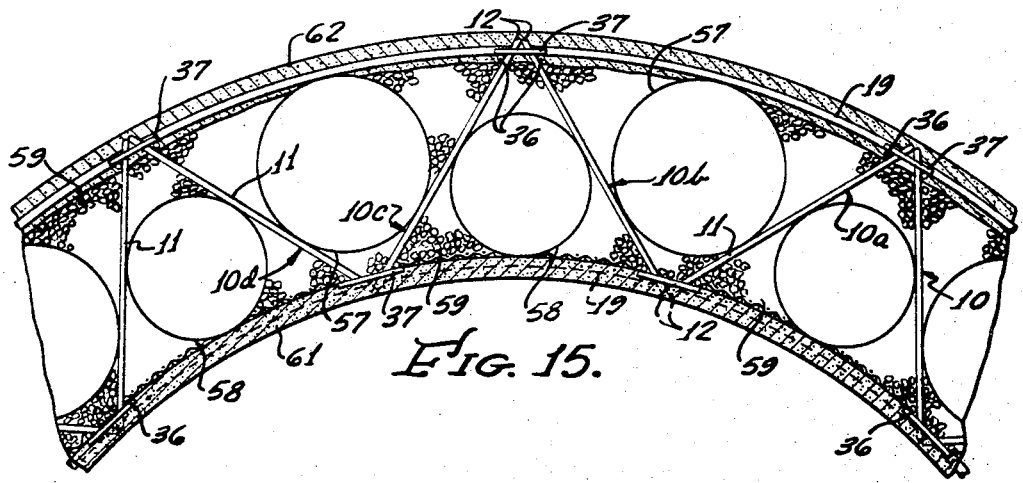
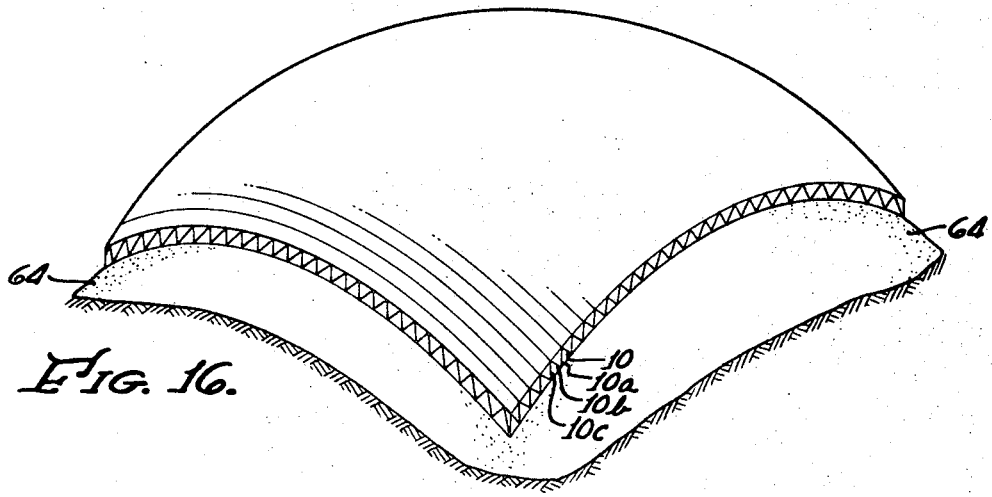
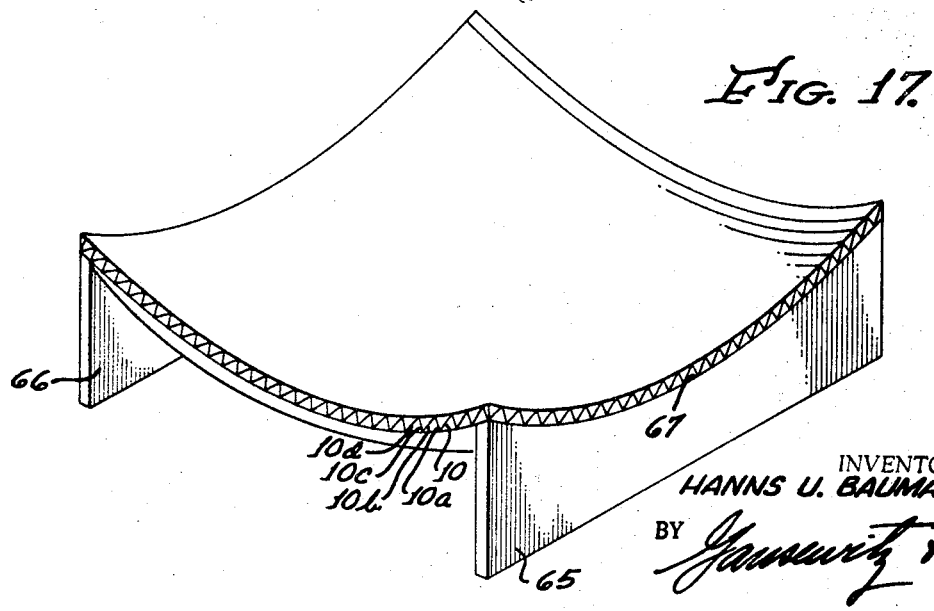
INVENTOR.
HANNS U. BAUMANN
BY
ATTORNEYS.

Oct. 29, 1968     H. U. BAUMANN     3,407,560
EXPANDED, TRUSSED STRUCTURAL ASSEMBLANCE
AND METHOD OF ASSEMBLY
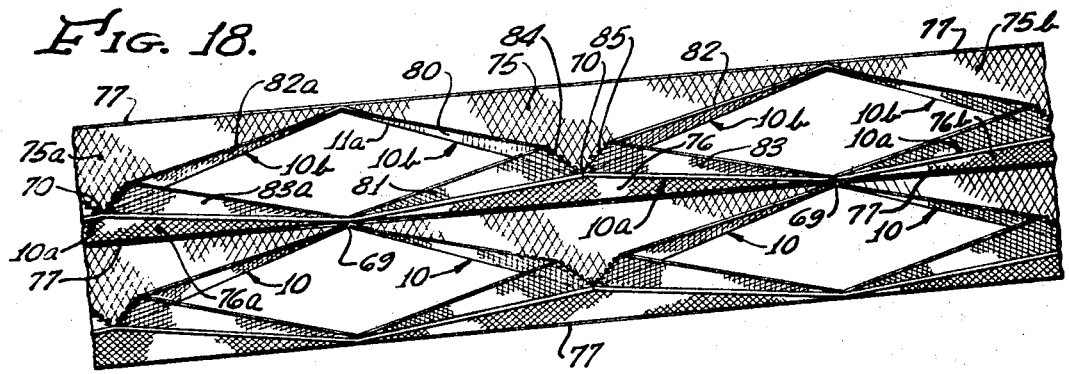
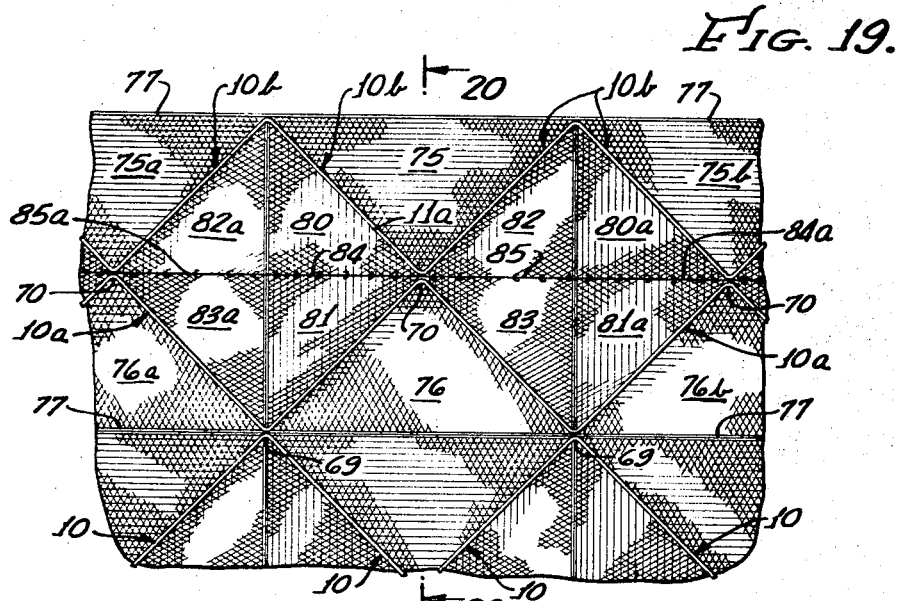
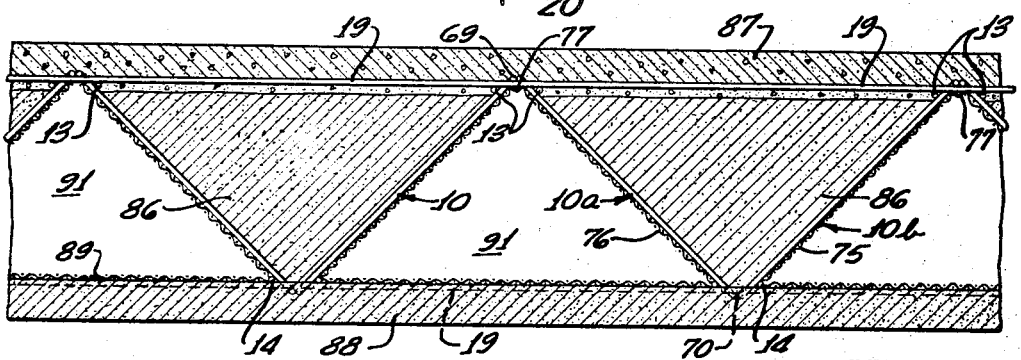

United States Patent Office 3,407,560
Patented Oct. 29, 1968

3,407,560
EXPANDED, TRUSSED STRUCTURAL ASSEMBLANCE AND METHOD OF ASSEMBLY
Hanns U. Baumann, 312 Emerald Bay,
Laguna Beach, Calif. 92651
Filed Oct. 21, 1965, Ser. No. 499,315
32 Claims. (Cl. 52—645)

ABSTRACT OF THE DISCLOSURE

A large number of generally corresponding zigzag bars are associated in expanded-accordion relationship relative to each other, and binding and gripping means are provided at each pair of adjacent apexes of the zigzag bars. Such binding and gripping means form portions of, and/or are so related to, transverse bars and/or chords in such manner that locked joints are achieved at the apexes.

---

This invention relates to a structural system which may be employed as a space-frame structure and/or which may serve as a self-supporting form and reinforcing system for concrete, plaster, foam plastic, etc. The invention further relates to the connection means by which the various elements of the system are rapidly connected at the job site. Additionally, the invention relates to methods of erecting the structural system.

The great expenses and delays inherent in the use of conventional forms, falsework, etc., for concrete structures has caused certain prior-art workers to provide various types of self-supporting trussed structures. These, however, have been characterized by numerous important defects or disadvantages. For example, such prior-art constructions were not readily erected in singly-curved and doubly-curved shapes, in additional to planar shapes, so that their use in various types of buildings and other structures was limited. Another very important disadvantage of such prior-art constructions was they could not be easily shipped in collapsed condition and then quickly expanded into various desired shapes for rapid locking in such shapes by strong and rigid connections which did not require welds. Other defects of such constructions included, for example, the difficulty and expense of associating various types of lath or other material therewith, the difficulty and expense of providing adequate void regions, the complexity thereof, the difficulty of mass-manufacturing the same, and numerous others.

In view of the above and other important deficiencies of the above-indicated and other prior-art constructions, it is a primary object of the present invention to provide a structural system which may be shipped in highly compact form and then readily and strongly connected at the job site as construction progresses, to result in various desired planar, singly-curved or doubly-curved shapes.

A further object is to provide a structural system which may be employed as the structure itself, with the mere addition of skin sheathing, or which may be used in conjunction with concrete, plaster, etc.

A further object is to provide a structural system which may be employed for numerous types of constructions including floors, roofs, walls, stairs, chimneys, columns, pipes, bridges, highways, tunnels, towers, sheet piling, retaining walls, etc.

A further object is to provide a structural system incorporating voiding means to create voids in one direction, or in two directions at right angles to each other, in a highly simple and low-cost manner.

A further object is to provide a structural system which may be readily molded over desired shapes, and which may be hung prior to assembly and then, if desired, inverted subsequent to assembly.

A further object is to provide an apparatus and method for effecting automatic expansion of fully-collapsed structural systems, and simultaneously providing voids in the finished systems.

An additional object is to provide joint or connector means by which low-cost mass-manufactured trussed elements may be rapidly and economically connected to provide strong and lasting joints at the job site, all in the absence of welding or other expensive operations.

Another object is to provide methods of effecting expansion, voiding, locking, etc., of space-frame and other structures, and to provide a method of singly-curving or doubly-curving structures in a rapid and simple manner.

These and other objects will become apparent from the foregoing detailed description taken in connection with the accompanying drawings in which:

FIGURE 1 is an isometric view showing a plurality of accordion-related trussed members in closely-stacked condition, ready for shipment to a job site;

FIGURE 2 is an isometric view illustrating the members of FIGURE 1 after expansion thereof and after insertion of struts or transverse members therethrough in order to form a self-supporting structural system;

FIGURE 3 is an enlarged fragmentary plan view illustrating one of the joint or connector means of the showing of FIGURE 2;

FIGURE 4 is a sectional view taken on line 4—4 of FIGURE 3;

FIGURE 5 is a sectional view on line 5—5 of FIGURE 3;

FIGURE 6 is a vertical sectional view illustrating one of the numerous types of structures in which the system shown in FIGURE 2 may be incorporated;

FIGURE 7 is a fragmentary isometric view corresponding generally to FIGURE 2 but illustrating a second embodiment of the invention;

FIGURE 8 is a plan view showing one of the joints of the embodiment of FIGURE 7;

FIGURE 9 is a fragmentary isometric view corresponding generally to FIGURE 2 but illustrating a third embodiment of the invention;

FIGURE 10 is a plan view illustrating one of the joints of the embodiment of FIGURE 9;

FIGURE 11 is an isometric view illustrating an additional form of joint or connector means;

FIGURE 12 is an isometric view illustrating a further form of joint or connector means;

FIGURES 13 and 14 are vertical sectional views illustrating forms of joint or connector means wherein inflatable or resilient elements are incorporated;

FIGURE 15 is a vertical sectional view illustrating a construction wherein pneumatic expandable means are provided to expand the structural system and also to create voids therein, the illustrated construction being singly-curved;

FIGURE 16 is an isometric view illustrating a doubly-curved structure incorporating the structural system of the present invention;

FIGURE 17 is a schematic representation of one manner of forming a singly-curved or doubly-curved structure;

FIGURE 18 is a fragmentary perspective view (as viewed from above) showing, in only partially-expanded condition, a structural system wherein sheet material is associated with the truss elements at the factory, such sheet material automatically opening into double-voided relationship in response to expansion of the accordion-like structural system;

FIGURE 19 is a top plan view illustrating the construction of FIGURE 18 after completion of expansion thereof; and FIGURE 20 is a sectional view taken on line 20—20 of FIGURE 19 but illustrating the construction after filling with insulation material, and after application of concrete, plaster, etc., to the structural system.

*Embodiment of FIGURES 1–6*

The first embodiment of the structural system of trussed members is shown in FIGURES 1–6, inclusive. Referring first to FIGURE 1, there is illustrated a plurality of corresponding zigzag or sinuous bars or rods 10, 10a, 10b, 10c, etc. Each of such bars therefore comprises a plurality of webs 11 which are connected at apex regions 12, the various webs being oriented at acute or obtuse angles relative to each other. The illustrated angles between webs are on the order of 90 degrees, as shown in FIGURE 4. Each of the zigzag or sinuous members 10 is preferably disposed, at least during manufacture and shipment, in a single plane which is parallel to and adjacent the planes contained in the other members 10a, 10b, 10c, etc. Thus, as shown in FIGURE 1, the bars or members 10, 10a, 10b, 10c, etc., are stacked closely adjacent each other in a highly compact relationship which facilitates shipment and storage.

The members 10, 10a, 10b, 10c, etc., and the other members described in the present specification, are, except as specifically stated, normally formed of a metal such as steel. It is, however, within the scope of the invention to form such members of other materials, such as plastics. The members may comprise, for example, inflatable tubes adapted to contain fluid under pressure, or to contain a hardenable substance such as a synthetic resin.

The webs 11 are preferably straight, as shown, but it is to be understood that the members 10, 10a, etc., may be generally sinusoidal or otherwise sinuous instead of being composed of straight sections oriented in zigzag relationship.

Suitably secured to the upper and lower apex regions 12 of each of the members 10, 10a, etc., are upper and lower chord elements 13 and 14, respectively. Preferably elements 13 and 14 are straight parallel rods or bars which are suitably welded to the apex regions 12 by mass-production techniques performed at the factory. Stated more definitely, the rods are spaced inwardly from the extreme apexes and thus form generally triangular openings 15 through which strut or transverse members are inserted as will be described in detail hereinafter. The welds which secure the chords to the zigzag bars are shown at 16 in FIGURES 3–5.

It will thus be understood that the webs 11 and chords 13 and 14 combine to form elongated trusses, so that great strength and rigidity are imparted to the resulting structure. Each such truss is preferably disposed, as above indicated, in a single plane although it is possible to provide the trusses in non-planar shapes.

The individual planar trusses are hinged together in collapsed-accordion relationship at the factory, and remain in such relationship during storage and during shipment to the job site. Hinging may be effected in any one of numerous economical ways, for example by means of the wire ties indicated at 17 and disposed around apex regions 12. It is to be understood, however, that staples, or any other form of economical joint, may be employed for the hinge means. It is a feature of the invention that the hinge means need not be strong, no structural loads being carried thereby.

As shown in FIGURE 1, for example, the upper apex regions of the first two zigzag bars 10 and 10a are hinged together by wire ties 17, whereas the lower apex regions of zigzag bars 10a and 10b are similarly hinged together. This relationship is continued indefinitely, for example, through the zigzag bars 10d and 10e shown in FIGURE 2, and through other and unshown zigzag bars, so that the entire structure may be readily stretched out or expanded in accordion-like manner at the job site. The openings 15 are thus generally aligned, both prior and subsequent to the expansion. Preferably, the chords 13 and 14 are welded on opposite sides of hinged-together apex regions, as best shown in FIGURES 3 and 5.

From the above, it will be understood that (after expansion) the planes of the truss elements are disposed in zigzag relationship relative to each other. Such zigzag relationship is not to be confused with the zigzag shape of each bar 10, 10a, etc., in such planes.

After the accordion-like stack of hinged trusses (FIGURE 1) has been at least partially expanded or extended at the job site, causing the planes of the trusses to be disposed at angles (in zigzag relationship) relative to each other, elongated strut or transverse elements 19 are inserted through the aligned openings 15 of corresponding apex regions 12. The extension of the accordion-like trusses is then completed, to increase the angle between adjacent truss planes, until the upper surfaces of chords 13 and the lower surfaces of chords 14 forcibly engage the struts 19 and force the same into binding relationship relative to extreme apex portions of apex regions 12 (FIGURES 4 and 5). The resulting frictional, shear and bending forces create an effective binding action which prevents longitudinal shifting of the struts 19 relative to the trusses, so that joint or connector means are provided. The described method of erection is extremely simple and fast, but results in very strong and satisfactory structures.

It will thus be seen that the chord bars 13 and 14 cooperate with the transverse bars or struts 19 in forming stop means which prevent more than a predetermined desired amount of opening or expansion movement of the accordion-related trusses. Furthermore, when such desired amount of expansion is achieved, the struts 19 forcibly and frictionally engage the apex regions. The strength of the hinge means 17 is immaterial to the strength of each completed joint or connection.

It will also be understood that the transverse elements 19 extend not only parallel to each other, but also parallel to the direction of accordion expansion.

Preferably, the struts or transverse members 19 comprise reinforcing rods or bars having protuberant bead portions 20 at spaced points therealong, such portions further aiding to prevent shifting of the struts relative to the engaged apex regions of the trusses.

There is thus erected at the job site, in a very minimum time and with but little effort, a strong structure which is highly effective in withstanding various types of forces and loads in all directions. The chords 13 and 14 and the struts 19 combine to form upper and lower parallel lattices which are spaced apart by the webs 11 of the zigzag or sinuous bars 10, 10a, etc. Such a construction is capable of withstanding great loads, and is extremely practical in that there are substantial voids between the upper and lower lattices and through which pipes, conduits, etc., may be extended.

Although the individual trusses have been indicated as normally lying generally in single planes, it is to be understood that a double-truss arrangement actually results in the finished structure. Thus, the struts 19 cooperate with the inclined webs 11 to provide trussing action in directions transverse to the planes of sinuous bars 10, 10a, etc.

As previously indicated, the described construction being entirely self-supporting, may be merely covered with a suitable thin sheathing or skin. There is illustrated in FIGURE 6, however, a typical arrangement whereby the construction is used in conjunction with plaster and concrete, being shown as provided in horizontal relationship between two adjacent stories of a building. In the illustrated construction, a layer of concrete 21 is poured over lathing 22 and forms the floor portion of one of the stories of the building. Similarly, a layer of plaster 23 is applied to lathing 24 and forms the ceiling of the adjacent lower story of the building. The upper and lower lattices (formed by bars 13, 14 and 19) are embedded, respectively, in the upper and lower layers 21 and 23 of the cementitious material. The described joints or connections are also embedded. Such material therefore imparts additional strength and rigidity to the construction, not only at the joint or connection regions but also at points therebetween.

The lathing 22 and 24 may comprise, for example, expandable metal lath which is mounted (in collapsed condition) at the factory onto the collapsed accordion-related trusses (FIGURE 1). Such lath then expands automatically at the job site as the trusses are extended (FIGURE 2). The lathing may be suitably supported adjacent the apex regions 12 of the zigzag bars 10, 10a, etc., being provided with suitable openings through which such bars extend.

It is to be understood that conduits, insulation, radiant heating ducts, etc., may readily be provided in or extended through the described structure. For example, a typical soil pipe is indicated at 26, a water pipe at 27, an electrical conduit at 28.

As will be emphasized hereinafter, the construction of FIGURES 1–6 may be oriented in a curved configuration (for example, along the surface of a cylinder) instead of lying in a single plane. This may be accomplished, for example, by spacing the apex regions 12 farther apart along the upper strut or transverse members 19 (upper lattice) than along the lower strut or transverse members (lower lattice). The distance between each chord 13 or 14 and the associated extreme apex is varied, at the factory, to compensate for the variations in the spacing of the apexes along the upper and lower struts 19. Thus, the desired binding relationships are achieved despite the fact that the upper and lower lattices then have different radiuses of curvature.

Embodiment of FIGURES 7 and 8

In the embodiment of FIGURES 7 and 8, the zigzag or sinuous bars 10, 10a, etc., are again employed, and are hinged together in accordion relationship as by the wire ties 17. However, the upper and lower chords 13 and 14 are not employed (unless unusually great strength is required). Instead, or in addition, grids or lattices 30 of welded bars 31 are provided. Although only the upper grid or lattice 30 is shown in FIGURES 7 and 8, it is to be understood that there is a corresponding lower grid or lattice for the lower apex regions of the sinuous bars. Thus, FIGURE 8 shows what would appear if one of the lower joints (not shown) were viewed from below.

Each grid or lattice 30 comprises sets of the bars 31 welded at right angles to each other by means of welds 32. At each set of hingedly-connected apex regions 12, one set of adjacent parallel bars 31 (numbered 31a and 31b in FIGURE 8) is adapted to engage webs 11 near apex regions 12, whereas a second set of adjacent parallel bars (numbered 31c and 31d in FIGURE 8) is also adapted to engage such webs. The bars in each set are relatively adjacent each other, as indicated, but are spaced sufficiently far apart that a rectangular opening 33 (illustrated as square) is formed by the interconnected bars 31 and is adapted to receive one pair of hinged apexes. The bars defining such rectangular opening 33 may be referred to as rectangularly-oriented bar means.

In the assembly of the construction of FIGURES 7 and 8, the sinuous bars 10, 10a, etc., are stacked at the factory and are hinged together as by wires 17 (as shown in FIGURE 1 except that no chords 13 and 14 need be present). After shipment to the job site, the accordion-like stack is partially (almost completely) extended and the grids 30 are disposed over the hingedly-connected apex regions 12 as shown in FIGURE 7, such apex regions being inserted through openings 33. Thereafter, struts or transverse members 19 are extended through aligned apex openings at elevations above the upper lattice 30, and below the lower lattice (not shown).

Additional accordion-like extension of the elements 10, 10a, 10b, 10c, etc., then creates the above-described binding relationship which achieves firm and rigid joints adjacent each of the lattice openings 33. The resulting structural system may then be provided with a suitable skin, if desired, or may be incorporated in various types of constructions such as the one shown in FIGURE 6, for example.

It is pointed out that, in construction wherein less strength is required, the transverse members or struts 19 may be eliminated and replaced by short pins at each of the joint regions. Each of such pins may have the same length, for example, as the strut section shown fragmentarily in FIGURE 8.

The described space-frame construction may be curved in a single plane, for example by causing the upper grid or lattice 30 to have openings 33 which are spaced farther apart than are the openings of the lower grid or lattice (not shown). Furthermore, the upper and lower grids may be curved, at the factory, as desired. The indicated variations in spacing between openings 33 may be effected in either one or both directions, namely, either generally parallel to the sinuous bars 10, 10a, etc., or generally transverse thereto.

Embodiment of FIGURES 9 and 10

In the embodiment of FIGURES 9 and 10, the zigzag or sinuous bars 10, 10a, etc., are again connected in accordion relationship as by suitable hinge means 17. After partial expansion of the accordion at the job site, ladder elements 35 are mounted over the hingedly-related apexes 12. Similarly to the embodiment of FIGURES 7 and 8, only the upper ladder elements 35 (and associated struts 19) are illustrated, it being understood that corresponding ladder and strut elements are provided for the lower apexes of the zigzag bars.

Each ladder 35 comprises two parallel rods or bars 36 to which are welded, by welds 37a and in right-angle relationship, cross-members or "rungs" 37. The cross-members 37 are so positioned that there will be one on each side of each set of apexes, but is is to be understood that rungs may be provided for the full lengths of the ladders in order to permit variations (at the job site) in the positions of the apexes so that curved configurations will result. As illustrated, each set of hinged apexes extends through an opening 38 defined by the cross-members 37 and by the rods 36 connected thereby.

After the accordion-related elements have been partially extended, and the ladder elements 35 mounted in position as shown, the struts or transverse bars 19 are extended through the aligned apexes and outwardly of the ladders. Thus, the upper struts 19 are disposed above the upper ladders, whereas the lower struts are disposed below the lower ladders. Various factors, including the spacing between the cross-members or rungs 37 defining openings 38, are so selected that the above-described binding relationship will result at each joint when the accordion-connected elements are fully expanded or extended. Full extension of the accordion is then effected to provide rigid joints as in the previous embodiment.

The structure shown in FIGURES 9 and 10 is extremely simple to erect in singly-curved configuration, it being merely necessary to vary the positioning of the apexes along struts 19. As previously indicated, the spacing between adjacent rungs 37, and between adjacent rods 36, may be varied in order to provide the requisite binding relationship despite the curved shape of the structure. It is also possible to provide doubly-curve configurations, by not only varying the spacing of the apexes along the struts but also varying the spacing of the apexes along the ladder elements.

It is to be understood that, for simplicity of illustration, the hinge elements 17 are omitted from the showings of FIGURES 7, 9, and certain other figures. It should be understood, however, that suitable hinge means should be provided in each embodiment in order to greatly facilitate erection of the structure at the job site.

Embodiment of FIGURE 11

Referring next to FIGURE 11, there is illustrated an embodiment which is highly flexible in that both singly-curved and doubly-curved configurations may be readily constructed and varied at the job site. FIGURE 11 illustrates only one of the numerous joints of the construction, it being understood that each of the upper and lower joints is identical to the one shown in FIGURE 11. Thus, FIGURE 11 also represents one of the lower joints if viewed from below.

The apex regions 12 of the zigzag or sinuous bars 10, 10a, etc., are hinged together in accordion relationship as by the wire ties 17 or other constructions. After the truss elements are expanded into the indicated angular relationship, a ring 40 is mounted over each set of hingedly-related apex regions 12. Such ring 40 has welded thereto first and second cam elements 41 and 42 having inclined cam surfaces 43 and 44, respectively. Such cam surfaces are disposed on the outer sides of the assembly, namely, on the upper sides of the upper rings and the lower sides of the lower rings (not shown).

Elongated rods 46 are extended through aligned sets of apexes 12 and perform the functions of the struts or transverse members 19 previously described. Elongated rods 47 are then extended at right angles to and below (in the case of the upper lattice) the rods 46 and perform the function of chords. In the case of the lower lattice (not shown), the rods 47 are disposed above rods 46. It is to be understood that each rod 46 and 47 extends through (or between) a substantial number of aligned apex regions.

It is then merely necessary to rotate each ring 40 in a horizontal plane until the cam surfaces 43 and 44 bear against the inner sides (lower sides in the case of the upper lattice) of rods 46. The cams 41 and 42 have such thicknesses that, at the same time, the main bodies of the rings 40 bear against the undersides (in the case of the upper lattice) of rods 47. Thus, the rings and cam surfaces create binding actions which lock the rods 46 and 47 against longitudinal shifting relative to the apexes 12.

The cams may be so constructed that, after they have created the described frictional locking action, they do not tend to rotate in the opposite direction to provide a releasing action. For example, small recesses may be provided at the ends of the cam surfaces and adapted to effect seating of portions of rods 46 therein.

In the embodiment of FIGURE 11, the accordion is normally fully expanded before the described joints are made. It is also possible, however, to further expand the accordion after making of the joints.

It will be understood that the embodiment of FIGURE 11 is particularly adapted for use in doubly-curved constructions in that adjustment may be effected readily in both directions, namely, along the rods 46 and along the rods 47. Numerous kinds of complex curves may thus be achieved, such curves being readily varied at the job site.

Embodiment of FIGURE 12

Referring next to FIGURE 12, there is again illustrated only one of the numerous joints of the space-frame construction. It is to be understood that, as before, all of the upper and lower joints are identical to the one illustrated.

Each of the zigzag elements 10, 10a, etc., has welded to the extreme apex region 12 thereof a chord rod (or bar) 49, it being understood that each chord rod extends along and is welded to all of the upper or lower apexes 12 of each zigzag bar. One of such welds is indicated at 50 in FIGURE 12. The axis of each rod 49 lies in the same plane as the axis of the zigzag bar to which such rod is welded.

The chord rods 49 are hinged together adjacent apexes 12 by suitable hinge means, for example the wire ties 17a and 17b as illustrated.

A loop member 51, which is preferably annular although various other configurations (such as square) may also be employed, is mounted over each set of interconnected apexes 12. Such loop or ring members 51 are mounted over the apex regions prior to welding of chord bars 49 thereto.

In the operation of the embodiment of FIGURE 12, the closely-stacked accordion-related elements 10, 10a, etc., are partially extended or expanded at the job site. Struts or transverse members 52 are then extended through the aligned openings defined adjacent various sets of apex regions 12. A binding action is then achieved by fully expanding the accordion. Thus, the webs 11 bear against the undersides (in the case of the upper joints) of rings 51, and the struts 52 bear against the undersides (in the case of the upper joints) of the apex regions 12. The forcing of the struts against the apexes is effected by the rings 51.

It is to be understood that the struts 52 may be provided with suitable protuberances, beads, depressions, etc., in this and all embodiments, to minimize the possibility of sliding of the struts relative to the apexes, and relative to the rings, after the joints are made.

The arrangement of FIGURE 12 is readily adapted for erection into singly-curved structures. Because of the presence of the chord rods 49 welded to the apexes, formation into doubly-curved configurations is less readily effected than in the embodiment of FIGURE 11.

Embodiments of FIGURES 13 and 14

Except as specifically stated, the embodiment of FIGURE 13 is identical to that of FIGURE 11. In the embodiment of FIGURE 13, there are no cam elements 41 and 42 provided on the ring 40. Furthermore, the rods 46 and 47 are replaced by smaller-diameter rods 46a and 47a which extend, respectively, through flexible, inflatable tubes 53 and 54. Such tubes may be formed of a soft plastic, metal, etc., and may be accordion shaped.

Tubes 53 and 54 are sufficiently large in diameter that, when they are inflated or pressurized in response to injection of a suitable fluid therein, a binding action will be created relative to the ring 40 and relative to apex regions 12, etc.

In the operation of the embodiment of FIGURE 13, the closely-stacked accordion-connected elements 10, 10a, etc., are extended or expanded at the job site as previously described in detail, following which fluid under pressure is introduced into the tubes 53 and 54 (and into the corresponding tubes for the lower apex regions of the zigzag elements). The tubes 53 and 54 are thus inflated, and create binding actions relative to rings 40 and apex regions 12, as stated above, so that a relatively rigid space-frame structure results. The metal rods 46a and 47a maintain the space-frame structure rigid in that longitudinal and transverse forces are transmitted thereby as well as by the various webs 11.

The fluid inserted may be gas, it being understood that the gas pressure may be maintained during the period when concrete, plaster, etc., is applied to the joint regions and then allowed to cure. It is also to be understood that the fluid introduced into the conduits 53 and 54 may be of a hardening nature, for example epoxy resin, so that composite constructions comprising the tubing 53 and 54, internal elements 46a and 47a, and hardened resin combine to transmit the various longitudinal and transverse forces. Such resin is indicated at 55.

The embodiment of FIGURE 14 is identical to that of FIGURE 12 except as will be specifically described. In the embodiment of FIGURE 14, a resilient means 56 is mounted parallel to and beneath the chord rods 49 in the vicinity of the rings 51, to aid in creating the requisite binding or locking action of each joint. The illustrated resilient means 56 is an elongated mass of an elastomeric or plastic material, such as natural or synthetic rubber or a suitable plastic, which mass may be cylindrical (when undeformed) in cross section. The mass 56 is secured to the undersides of rods 49, and parallel thereto, the length being preferably longer than the diameter of ring 51. The mass 56 is compressed, in response to extension or expansion of the accordion-related elements 10, 10a, etc., and in response to insertion and binding of the struts 52.

It is to be understood that other suitable resilient means, for example spring devices of suitable construction, may be employed in place of the mass 56 of resilient material.

*Description of certain additional methods of erection of the space-frame structures, FIGURES 15–17*

Referring first to FIGURE 15, there is illustrated the incorporation of the ladder-type system (embodiment of FIGURES 9 and 10) into a singly-curved or barrel vault structure. It is to be understood, however, that various joints or connections other than ladder type, and comprehended within the present invention, may be employed. The various rungs or cross-members of the ladders are shown at 37, and the sides are shown at 36. The webs of the zigzag bars are designated 11, the apex regions 12, etc.

The transverse members or struts are shown at 19 and are curved in accordance with the desired radius of the barrel vault structure. As previously indicated, in such upwardly-convex configurations the distances between adjacent joints at the upper regions of the construction are greater than the distances between adjacent joints at the lower regions thereof.

It is a major feature of the construction of FIGURE 15 that expansion of the accordion-related zigzag elements, and creation of desired voids in the completed structure, are effected through use of flexible, inflatable large-diameter tubes 57 and 58 (formed of a suitable plastic, etc.) and disposed between the adjacent trusses. Tubes 57 are shown as being relatively large in diameter, whereas tubes 58 are relatively small, in order to compensate for the curvature of the construction. It is to be understood that, in planar constructions, the diameters of all tubes are the same.

The construction of FIGURE 15 may be erected in the following manner. Suitable tie means, not shown, are connected between adjacent ones of the upper joints, and other suitable tie means are connected between adjacent ones of the lower joints, such tie means being adapted to determine the spacing between such joints. Thus, the tie means are so selected that the distances between the upper joints will (in the illustrated barrel vault construction) be substantially longer than the distances between the lower joints. Such tie means are preferably mounted at the factory, and are incorporated in a nest or stack comprising all of the elements 10, 10a, 10b, etc. The tubes 57 and 58 are mounted in such stack at the factory, in collapsed condition. The various ladder elements 35 (FIGURES 9 and 10) are mounted over the hinged apex regions 12 and are secured loosely in position by suitable means, not shown.

At the job site, it is merely necessary to introduce fluid (preferably gas) under pressure into the tubes 58 and 57 in order to effect full expansion thereof. Such expansion causes the space-frame construction to assume the illustrated singly-curved shape, because of the differences in spacing between the upper and lower joints as described above. Before full expansion has been effected, the struts 19 are inserted. Full expansion is then effected to achieve the binding and locking relationship described in detail heretofore.

The wall thicknesses (and materials) of inflatable tubes 57 and 58 should be such that such tubes will remain in their substantially cylindrical (or other desired) form after cessation of application of fluid pressure thereto. Thus, the tubes 57 and 58 form voids between the upper and lower lattices of the present space-frame construction.

In one highly advantageous mode of completion of the structure of FIGURE 15, paper-backed wire mesh (or other suitable skin) is applied to the underside of the lower lattice and to the upper side of the upper lattice. A suitable lightweight filler material, such as vermiculite, pearlite, etc., and indicated at 59, is then pumped into the spaces between the lattices and around the tubes 57 and 58. This provides a highly effective insulation layer. Plaster is then sprayed onto the paper-backed mesh at the underside of the construction, and a suitable spray-on roofing material is applied to the upper side of the wire mesh above the upper lattice. The combination wire mesh and the plaster is indicated schematically at 61, whereas the combination wire mesh and spray-on roofing material is indicated schematically at 62. It is, of course, to be understood that various other constructions, including concrete, plaster, metal, etc., may be employed.

Referring next to FIGURE 16, there is illustrated a method of erecting one or more of the above-described space-frame constructions in a doubly-curved (or singly-curved) configuration. A mound of earth, schematically represented at 64, is first provided, the upper surface of the earth being shaped in the desired curved configuration. One of the above-described constructions (for example, the one described relative to FIGURE 11) is then mounted over the mound of earth 64, so that the space-frame construction assumes the same shape (illustrated as upwardly convex) as the upper surface of the earth. Concrete, plaster, etc., is then applied to the space-frame construction to result in a completed voided, or void-free, structure as desired. It is then merely necessary to remove the earth 64 from beneath the completed construction in order to provide (for example) the roof of a building. More desirably, the rigid space frame is lifted off the earth 64 and moved to a point of use.

Referring next to FIGURE 17, another method of providing a doubly-curved (or single-curved) structure is schematically represented. Suitable curved support means, illustrated as supporting walls 65 and 66, are shown as provided in spaced, parallel relationship (although parallelism is not essential). The upper edge portions 67 of the walls are curved, for example in the illustrated downwardly-concave manner, and are provided with suitable connector means (not shown) for the ends of the struts or transverse members 19.

In erecting the space-frame construction in accordance with the method of FIGURE 17, the ends of the struts 19 are connected along the upper edge portions 67 of walls 65 and 66 as indicated above. Since they extend between walls 65 and 66 which are spaced a relatively long distance apart, the struts 19 hang in the manner of catenaries. A closely-stacked nest of zigzag bars 10a, 10b, 10c, etc. is then expanded along the suspended struts 19, for example by inflating members such as those indicated at 57 and 58 in FIGURE 15. After such expansion is completed, rigid joints are formed as described in detail heretofore. Certain ring-type embodiments, FIGURES 11 and 13, are particularly suitable for erection in the manner stated in this paragraph.

The completion of the joints causes the space-frame construction to be rigid, so that it may be inverted through use of a suitable crane or cranes. Thus, the "draped" configuration is caused to result in a dome. It is to be understood that concrete, plaster, skin, etc., may be applied after the structure is inverted.

*Embodiment of FIGURES 18–20*

FIGURES 18–20 illustrate a space-frame construction in which double voiding is achieved automatically as the accordion-related elements are expanded, and in which pockets are provided automatically for vermiculite or other insulation. The space-frame construction may be basically the same as the one shown in FIGURES 1–5, for example, although the bars 13, 14 and 19 are omitted in FIGURES 18 and 19 for purposes of simplicity of illustration. Thus, zigzag or sinuous bars 10, 10a and 10b are represented in FIGURES 18 and 19 and are hinged together as described relative to FIGURES 1–5.

The zigzag elements 10 and 10a are connected together at hinge regions 69 which are disposed at relatively high elevations. On the other hand, the zigzag elements 10a and 10b are connected together at hinge regions 70 which are disposed at relatively low elevations.

Sheet material, for example wire mesh, paper, cloth, plastic, sheet metal, etc., is connected to each of the elements 10, 10a, 10b etc., in the same planes (respectively) as such elements and by any suitable means such as stapling, welding, gluing, etc. The panels of such sheet material are triangular and may be termed "butterfly-shaped" in that two such triangular panels meet at each of the low-elevation hinge areas, such as 70. There are, however, no corresponding triangular panels which meet in butterfly-relationship (FIGURE 18) at the high-elevation hinge areas, such as region 69.

As an example, two triangular panels 75 and 76 meet at the lower hinge region 70 shown at the central portion of FIGURES 18 and 19, whereas corresponding triangular panels meet at all of the other low-elevation hinge regions 70 and corresponding low-elevation hinge regions. Panel 75 is disposed in the plane of, and is secured to, the zigzag member 10b, whereas panel 76 is disposed in the plane of, and is secured to, the zigzag member 10a. Similar relationships apply to panels 75a–76a, 75b–76b, etc.

The edges of triangular panels 75, 76 (and corresponding panels) which are disposed at high elevations extend between high-elevation hinge regions 69 and are designated, for example, 77. The sheet material is folded at such high edges, meeting the material of adjacent panels at fold or connection regions. At the extreme peripheral regions of the space-frame construction, the material is not folded at 77 which then comprises a raw edge.

As thus far described, therefore, the panels of sheet material represent a plurality of butterflies, the long edge of each butterfly wing meeting the long edge of an adjacent butterfly wing at one of the fold lines 77. There will next be described the means for automatically filling in the areas thus remaining, and providing pockets for vermiculite or other insulating material.

Four right-triangular panels 80–83 of sheet material are provided in folded relationship and meet at each of the low-elevation hinge regions 70 (and corresponding low-elevation hinge regions). Each panel 80 (and corresponding panels) is suitably hingedly connected to panel 81 along the hinge line 84. Correspondingly, each panel 82 (and corresponding panels) is hingedly connected to panel 83 along the hinge line 85. It is to be understood that each hinge line may comprise a fold, etc.

One edge of each of the panels 80–83 is connected hingedly (at a web 11) to an adjacent edge of each of the panels 75, 76, and corresponding panels. Thus, for example, panels 75 and 80 are hinged together along one of the webs (designated 11a) of zigzag member 10b.

The shapes and sizes of the panels 80–83 (and corresponding panels) are such that complete expansion of the accordion-related elements 10, 10a, 10b, 10c, etc., causes adjacent hingedly-connected panels to fold into a single plane and fill in the spaces defined by edge portions of the "butterfly wings." Thus, for example, the right-triangular panels 80 and 81 (which are shown in FIGURE 18 when the members 10, 10a, etc., are only partially expanded) become co-planar when full expansion is achieved as shown in FIGURE 19.

The resulting construction (FIGURES 19 and 20) is a plurality of inverted, hollow, square-based pyramids each adapted to receive vermiculite or other suitable insulation material. The base of each pyramid touches the base of each of the four pyramids therearound, so that no open spaces are left when the construction is viewed from above as in FIGURE 19. However, there are "doube voids" along the apex (lower) portions of the pyramids and through which conduits, pipes for radiant heating, etc., may be extended in mutually perpendicular directions as is highly desirable in building constructions.

Referring particular to FIGURE 20, the vermiculite is indicated at 86. The described structure is shown as incorporated in a floor construction having an upper layer 87 of concrete and a lower layer 88 of plaster. The concrete (and, if desired, the plaster) is mounted on suitable expanded metal lath 89, for example, and as described relative to FIGURE 6. Such lath 89 may be shipped in unexpanded condition and then expanded automatically as the accordion-related truss elements are expanded.

The above-described voids for conduits, etc., are indicated at 91 in FIGURE 20. It is to be understood that a section taken at right angles to FIGURE 20 would show similar voids for other conduits, etc.

To summarize the manner of erection of the structure shown in FIGURES 18–20, the zigzag elements 10, 10a, 10b, and related panels of sheet material are tightly nested together at the factory and then shipped to a job site. Thereafter, partial expansion of the accordion-related elements is effected, for example to the partially expanded position shown in FIGURE 18. The struts or transverse members 19 (FIGURE 20) are then inserted through the apex regions as described in detail relative to FIGURES 1–5, following which the accordion-related elements are fully expanded to achieve locking of the joints.

The described expansion of the accordion effects pivotal movement of the panels 80–81, 82–83, etc., about the hinges therefor and into planar relationships such that elements 80 and 81 lie in a single plane, as do elements 82 and 83, etc.

It is then merely necessary to fill in the inverted-pyramidal pockets with vermiculite 86 or other appropriate insulation material, and apply plaster 88 to the lower latticework and concrete 87 to the upper latticework.

There is thus provided, in an extremely fast and simple manner, an insulated and double-voided construction having numerous desirable properties.

*General description and summary*

In summary, the present invention provides a remarkably simple and quickly-erected means (and method) of creating a strong and self-supporting space-frame (or other) structure. It is to be understood that the joints formed at the upper lattice (bars 13 and 19, for example) cooperate with the joints formed at the lower lattice (bars 14 and 19, for example) in preventing either further extension, or collapse, of the accordion-like structure formed by the hinged zigzag members 10, 10a, 10b, etc. The binding action effecting prevention of accordion extension (after achievement of a predetermined desired amount of such extension) is described in detail above. The mechanisms and relationships by which collapse of the accordion is prevented may be partially understood if it is comprehended that a shifting of the upper lattice away from the lower lattice is a necessary result of such collapse (because the plane containing the upper apexes must move away from the plane containing the lower apexes during such collapse). However, such shifting of the upper lattice away from the lower one is rendered impossible by the transverse bars 19 (and equivalents thereof), acting as locking means and in conjunction with the webs 11, etc. Thus, since the lattices may not move apart, the accordion-like structure may not collapse or compress.

Conversely, further extension of the accordion (beyond the predetermined desired amount) must be accompanied by shifting the lattice planes towards each other. Such shifting of the lattice planes is impossible, being prevented (for example) by engagement of the rings 40, grids 30, ladders 35, etc., with the divergent webs 11. Thus, further extension of the accordion may not occur.

It is also pointed out that the above-described frictional binding action at the struts or transverse rods 19 may be further supplemented, or replaced in some instances, by the protuberant bead portions 20 (or mechanical equivalents thereof, which mechanical equivalents may be much larger than the illustrated beads). However, insertion of the rods 19 through the apex openings is then rendered less easy.

It is to be understood that, relative to each embodiment, the ends of the zigzag structure formed by the accordion-related truss elements are anchored in a suitable manner. For example, such ends may be suitably welded or otherwise connected to foundation or support means (not shown) provided at the end portions of the zigzag structure.

Relative to all embodiments, the force of gravity is a substantial aid in rendering the joints strong and non-slipping.

It is to be understood that, in some applications, the transverse members or struts 19 may be omitted and completely replaced by inflatable elements such as the tubes 57 and 58 shown in FIGURE 15. It is also to be understood that such a system may be packaged in an airtight flexible container (membrane) and then collapsed by drawing a vacuum within the package. The entire package may then be expanded by pressurizing the longitudinal tubes (such as 57 or 58). The container may be employed as a mold to hold suitable filler material, such as polyurethane foam, etc., which is introduced into the container around the tubes.

It is emphasized that the transverse members or struts 19 may also be replaced by hinged elements adapted to be readily packaged in collapsed condition and then rotated automatically into final position as the structure expands (i.e., is unfolded). The hinged joints may be be adapted to snap into locked condition in response to extension or unfolding of the accordion structure. Such an arrangement is also readily adapted for packaging and shipment in a collapsed bag as indicated above.

For purposes of simplicity, some of the appended claims are drafted in terms of an accordion structure which is expanded in a generally horizontal plane. It is emphasized, however, that such claims are also to be interpreted as covering curved constructions (single and double), vertical constructions, etc.

Throughout this specification and claims, the words "binding" and/or "gripping" denote jamming, so that freedom of movement is (at least in one direction) no longer present. Such words do not denote the type of binding that is effected, for example, by wrapping or tying a wire about a joint or the like.

The foregoing detailed description is to be clearly understood as given by way of illustration and example only, the spirit and scope of this invention being limited solely by the appended claims. For example, the walls 65 and 66 (FIGURE 17) may be replaced by cables suspended from braced columns. Also, the insulation 86 (FIGURE 20) may be replaced by a structural material such as concrete. In addition, radiant heating may be achieved, without providing ducts, by pumping hot air through the void spaces 91 (FIGURE 20).

I claim:

1. A structural system, which comprises:
   a multiplicity of generally planar elongated truss elements,
   hinge means to hinge said truss elements together in accordion relationship, and
   means to prevent more than a predetermined amount of expansion of the accordion-like structure formed by said truss elements,
      said predetermined amount being such that said truss elements are disposed in expanded, zig zag relationship relative to each other,
      said means to prevent more than a predetermined amount of expansion of said accordion-like structure comprising:
         a multiplicity of transverse elements extended generally parallel to the direction of the expansion of said structure, and
         means to create a binding and gripping relationship between said transverse elements and said truss elements after expansion of said structure by said predetermined amount.

2. The invention as claimed in claim 1, in which said means to create a binding and gripping relationship is so related to said transverse elements and to said truss elements that said binding and gripping relationship is achieved automatically in response to expansion of said structure by said predetermined amount.

3. The invention as claimed in claim 1, in which said means to create a binding and gripping relationship comprises a multiplicity of lock means adapted to be operated individually after expansion of said structure by said predetermined amount.

4. A structural system, which comprises:
   a multiplicity of generally corresponding zigzag bars,
      said zigzag bars being arranged in expanded-accordion relationship relative to each other,
      said zigzag bars being arranged with the apex portions thereof in general alignment with the apex portions of the bars adjacent thereto,
   a multiplicity of elongated transverse bars,
      each of said transverse bars extending adjacent one row of aligned apex portions of said zigzag bars, and
   means to form binding connections between said transverse bars and said zigzag bars whereby to render the structural system rigid.

5. The invention as claimed in claim 4, in which said zigzag bars are so related to each other that each apex portion of each bar is adjacent an apex portion of an adjacent zigzag bar, in which each of said transverses bars extends through both apex openings defined by said adjacent apex portions, and in which said binding means effects close frictional engagement between said transverse bars and the extreme apex areas of said adjacent apex portions.

6. The invention as claimed in claim 5, in which means are provided to hinge together each set of said adjacent apex portions, whereby said zigzag bars may be stored and shipped in closely-stacked relationship and then readily expanded at the job site in the manner of an accordion.

7. The invention as claimed in claim 5, in which each of said transverse bars is formed with protuberant portions adapted to minimize the possibility of shifting thereof relative to said apex portions.

8. The invention as claimed in claim 4, in which each of said zigzag bars lies generally in a single plane.

9. The invention as claimed in claim 4, in which elongated longitudinal or chord bars are extended along the apex regions of each of said zigzag bars, said chord bars being perpendicular to said transverse bars, said transverse bars and chord bars combining to form upper and lower lattices connected by the web portion of said zigzag bars.

10. In a construction wherein a multiplicity of generally corresponding zigzag bars are arranged in expanded-accordion relationship with the apexes of each bar respectively adjacent the apexes of an adjacent bar, a joint or connection between each set of adjacent apexes, each such joint or connection comprising:
   a chord bar secured to two webs of one of said zigzag bars in spaced relationship from the adjacent apex thereof,
      said chord bar and said webs cooperating to define an apex opening adapted to receive a transverse bar, a chord bar secured to two webs of the adjacent zigzag bar in spaced relationship from the apex thereof.

said last-mentioned chord bar and webs cooperating to define an apex opening opposite said first-mentioned apex opening and adapted to receive said transverse bar, and a transverse bar extended through said apex openings, the diameter of said transverse bar being sufficiently large, in comparison to the spacing of said chord bars from said apexes, that said chord bars bind said transverse bars against said apexes when said accordion-related zigzag bars are expanded a predetermined desired amount.

11. The invention as claimed in claim 10, in which said chord bars and transverse bars extend from joint to joint and form parallel lattices of perpendicularly-arranged bars, said lattices being connected by the webs of said zigzag bars.

12. The invention as claimed in claim 10, in which adjacent apexes of said zigzag bars are hinged to each other whereby to facilitate expansion of the accordion structure prior to completion of the joints.

13. In a building construction wherein a multiplicity of generally corresponding zigzag bars are arranged in expanded-accordion relationship with the apexes of each bar respectively adjacent the apexes of an adjacent bar, a joint or connection between each set of adjacent apexes, each such joint or connection comprising:

closed-loop bar means mounted over a set of adjacent apexes, said bar means resting upon the four webs which define the two adjacent apexes, the size of said bar means being such that the two webs of one of said zigzag bars and one portion of said bar means cooperate to define an apex opening adapted to receive a lock means, the size of said bar means also being such that the two webs of the other of said zigzag bars and an opposite portion of said bar means cooperate to define a second apex opening opposite said first-mentioned opening and adapted to receive said lock means, and a lock means extended through said openings, said lock means being a transverse bar the size of which is sufficiently large, in comparison to the spacing of said bar means from said apexes, that said transverse bar binds with said bar means.

14. The invention as claimed in claim 13, in which said transverse bar extends from joint to joint through a multiplicity of aligned apex openings and aids in rendering the construction rigid.

15. The invention as claimed in claim 13, in which said adjacent apexes are hinged to each other whereby to facilitate expansion of the accordion-related zigzag bars.

16. The invention as claimed in claim 13, in which said closed-loop bar means is a ring.

17. In a building construction wherein a multiplicity of generally corresponding zigzag bars are arranged in expanded-accordion relationship with the apexes of each bar respectively adjacent the apexes of an adjacent bar, a joint or connection between each set of adjacent apexes, each such joint or connection comprising:

closed-loop bar means mounted over a set of adjacent apexes, said bar means being rectangularly oriented and forming part of a welded lattice extending from joint to joint, said bar means resting upon the four webs which define the two adjacent apexes, the size of said bar means being such that the two webs of one of said zigzag bars and one portion of said bar means cooperate to define an apex opening adapted to receive a lock means, the size of said bar means also being such that the two webs of the other of said zigzag bars and an opposite portion of said bar means cooperate to define a second apex opening opposite said first-mentioned opening and adapted to receive said lock means, and a lock means extending through said openings, said lock means being a transverse bar the size of which is sufficiently large, in comparison to the spacing of said bar means from said apexes, that said transverse bar binds with said bar means, said transverse bar extending parallel to one set of bars in said lattice, said transverse bar extending perpendicular to the other set of bars in said lattice.

18. In a building construction wherein a multiplicity of generally corresponding zigzag bars are arranged in expanded-accordion relationship with the apexes of each bar respectively adjacent the apexes of an adjacent bar, a joint or connection between each set of adjacent apexes, each such joint or connection comprising:

closed-loop bar means mounted over a set of adjacent apexes, said bar means being rectangularly oriented, said bar means resting upon the four webs which define the two adjacent apexes, the size of said bar means being such that the two webs of one of said zigzag bars and one portion of said bar means cooperate to define an apex opening adapted to receive a lock means, the size of said bar means also being such that the two webs of the other of said zigzag bars and an opposite portion of said bar means cooperate to define a second apex opening opposite said first-mentioned opening and adapted to receive said lock means, and a lock means extending through said openings, said lock means being a transverse bar the size of which is sufficiently large, in comparison to the spacing of said bar means from said apexes, that said transverse bar binds with said bar means, said transverse bar extending from joint to joint through a multiplicity of aligned apex openings and aiding in rendering the construction rigid, at least two opposite sides of said rectangularly-oriented bar means forming parts of ladder elements extending from joint to joint perpendicularly to said transverse bar.

19. In a construction wherein a multiplicity of generally corresponding zigzag bars are arranged in expanded-accordion relationship with the apexes of each bar adjacent the apexes of an adjacent bar, a joint or connection between each set of adjacent apexes, such joints or connections comprising:

a ladder element having two parallel sides and a plurality of rungs extending perpendicular to said sides, said sides and two adjacent ones of said rungs defining an opening through which two adjacent apexes of said zigzag bars are extended, one of said sides being adjacent the two webs of one of said zigzag bars, the other of said sides being adjacent the two webs of the adjacent one of said zigzag bars, said rungs each being adjacent, respectively, two webs of the two adjacent zigzag bars, said sides and said rungs defining together with said webs opposed apex openings through which a transverse bar may be extended, and a transverse bar extended through said apex openings.

20. The invention as claimed in claim 19, in which said sides of said ladder extend from joint to joint and serve as chords for said zigzag bars, and in which said transverse bars extend from joint to joint and serve as struts for said zigzag bars.

21. The invention as claimed in claim 19, in which hinge means are provided to hinge together said adjacent apexes whereby to facilitate expansion of said zigzag bars from closely-nested accordion relationship to expanded accordion relationship.

22. In a structural system wherein a multiplicity of generally corresponding zigzag bars are arranged in expanded-accordion relationship with the apexes of each bar adjacent the apexes of an adjacent bar, a joint or connection between each set of adjacent apexes, each such joint or connection comprising:
a ring having an opening therein adapted to receive the adjacent apex portions of two adjacent ones of said zigzag bars,
the webs of one of said zigzag zars adjacent an apex thereof defining together with said ring an apex opening adapted to receive a transverse bar,
the webs of the other of said zigzag bars adjacent an apex thereof defining together with said ring an apex opening disposed opposite said first-mentioned apex opening and also adapted to receive said transverse bar,
a transverse bar extended through said apex openings, and a chord bar extended in perpendicular relationship to said transverse bar and engaging said transverse bar on the side thereof remote from said apexes, said chord bar being disposed between said ring and said transverse bar.

23. The invention as claimed in claim 22, in which means are provided to effect binding of at least one of said transverse bar and said chord bar relative to said apexes whereby to form a fixed joint when said accordion-related zigzag bars are expanded by a predetermined amount.

24. The invention as claimed in claim 23, in which said last-named means comprises cam elements provided on said ring and adapted to bind with one of said bars in response to rotation of said ring.

25. The invention as claimed in claim 22, in which means are provided to hinge said adjacent apexes to each other.

26. In a building construction wherein a multiplicity of generally corresponding zigzag bars are arranged in expanded-accordion relationship with the apexes of each bar respectively adjacent the apexes of an adjacent bar, a joint or connection between each set of adjacent apexes, each such joint or connection comprising:
a loop means mounted over each set of adjacent apex portions of said zigzag bars,
the webs of one of said zigzag bars adjacent an apex thereof defining together with said loop means an apex opening adapted to receive a transverse bar,
the webs of the other of said zigzag bars adjacent an apex thereof defining together with said loop means an apex opening opposite said first-mentioned apex opening and adapted to receive said transverse bar,
first and second chord bars secured, respectively, to the extreme apex portions of said zigzag bars on the sides thereof remote from said loop means,
and a transverse bar extended through said apex openings perpendicular to said chord bars.

27. The invention as claimed in claim 26, in which means are provided to hinge said chord bars to each other.

28. A method of erecting a building structure, which comprises:
providing a multiplicity of corresponding zigzag bars in closely-stacked collapsed-accordion relationship,
said bars being hinged together in the manner of an accordion, with the apex portions of each zigzag bar generally aligned with the apex portions of adjacent zigzag bars,
providing on said zigzag bars, adjacent the apex portions thereof, binding means which cooperate with the webs of said zigzag bars to define apex openings at said apex portions,
partially expanding said accordion-related zigzag bars,
thereafter inserting transverse bars through aligned ones of said apex openings, and
thereafter further expanding said accordion-related zigzag bars until said binding means lock said transverse bars against the extreme apex portions of said zigzag bars.

29. A structural system, comprising:
a multiplicity of corresponding zigzag bars disposed in expanded-accordion relationship,
an upper lattice of crossed members disposed adjacent the plane containing the upper apexes of said zigzag bars,
a lower lattice of crossed members disposed adjacent the plane containing the lower apexes of said zigzag bars, and
joint means cooperating with the webs of said zigzag bars to prevent said upper and lower lattices from moving toward or away from each other whereby collapse or expansion of the accordion formed by said zigzag bars is prevented,
said joint means being free of welds between said lattices and said zigzag bars.

30. The invention as claimed in claim 29, in which said joint means comprises lock means extending through the apexes of said zigzag bars, and means associated with said zigzag bars to prevent shifting of said lock means toward a medial plane parallel to said lattice planes and midway therebetween.

31. The invention as claimed in claim 30, in which said lock means comprises elongated transverse bars or struts extending through a multiplicity of apexes of said zigzag bars.

32. The invention as claimed in claim 30, in which said last-named means comprises closed loop-like elements mounted, respectively, around adjacent apex portions of said zigzag bars and between said lock means and said medial plane.

References Cited
UNITED STATES PATENTS

| | | | |
|---|---|---|---|
| 782,877 | 2/1905 | Roney | 52—648 |
| 1,545,148 | 7/1925 | Lindan | 52—646 |
| 1,727,147 | 9/1929 | Weston | 52—648 |
| 1,804,132 | 5/1931 | Tashjian | 52—334 |
| 2,314,456 | 3/1943 | Nadell | 52—646 |
| 3,313,082 | 4/1967 | Seaborg | 52—646 |
| 3,344,571 | 10/1967 | Day | 52—648 |
| 1,291,298 | 1/1919 | Walker | 52—648 |
| 1,733,779 | 10/1929 | Connell | 52—648 |

FOREIGN PATENTS

| | | |
|---|---|---|
| 77,206 | 9/1918 | Austria. |
| 299,443 | 7/1917 | Germany. |
| 14,915 | 6/1911 | Great Britain. |

HENRY C. SUTHERLAND, *Primary Examiner.*